United States Patent
Zeidman

(10) Patent No.: US 10,116,999 B2
(45) Date of Patent: Oct. 30, 2018

(54) METHOD FOR ADVERTISERS TO SPONSOR BROADCASTS WITHOUT COMMERCIALS

(71) Applicant: Robert M Zeidman, Cupertino, CA (US)

(72) Inventor: Robert M Zeidman, Cupertino, CA (US)

(73) Assignee: Firtiva Corporation, Cupertino, CA (US)

(*) Notice: Subject to any disclaimer, the term of this patent is extended or adjusted under 35 U.S.C. 154(b) by 445 days.

(21) Appl. No.: 13/632,574

(22) Filed: Oct. 1, 2012

(65) Prior Publication Data

US 2013/0031573 A1   Jan. 31, 2013
US 2016/0261925 A9   Sep. 8, 2016

Related U.S. Application Data

(63) Continuation of application No. 09/767,819, filed on Jan. 22, 2001, now Pat. No. 8,316,390.

(51) Int. Cl.
*G06Q 30/02* (2012.01)
*H04L 29/08* (2006.01)
(Continued)

(52) U.S. Cl.
CPC ......... *H04N 21/812* (2013.01); *G06F 3/1454* (2013.01); *G06Q 30/0207* (2013.01);
(Continued)

(58) Field of Classification Search
CPC .. G06F 3/048; G06F 3/0482; G06F 17/30017; G06F 17/30843; H04N 21/458;
(Continued)

(56) References Cited

U.S. PATENT DOCUMENTS 5,488,423 A    1/1996   Walkingshaw et al.
5,796,952 A *  8/1998   Davis .................. G06F 11/3438
                                                707/E17.12
(Continued)

OTHER PUBLICATIONS

"Lawmaker Criticizes 'Schindler's List' Airing Wendnesday, Feb. 26, 1997",[online] [retrieved on Dec. 7, 2006] Retrived from the Internet <URL: http://www.writing.upenn.edu/-afilreis/HolocausVschindler-on-tv.html>.
(Continued)

*Primary Examiner* — Jeffrey A Gaffin
*Assistant Examiner* — Nhat Huy T Nguyen
(74) *Attorney, Agent, or Firm* — Jim H. Salter

(57) ABSTRACT

A system and method that allows content to be broadcast without commercial interruption, yet lets the company or companies that sponsor the broadcast to offer advertisements and discounts and various special offers to the viewers at a later time. The amount of time a viewer spends watching a particular broadcast is recorded along with information about the sponsoring companies or organizations for the broadcast. The viewer later accesses a central database, which sends back to the viewer advertisements, coupons, discounts, contests, and other enticements to purchase products, based on the amount of time the viewer spent watching broadcasts or segments of broadcasts that were sponsored by the advertiser.

34 Claims, 6 Drawing Sheets

(51) Int. Cl.
  *H04N 1/32* (2006.01)
  *G06F 11/34* (2006.01)
  *H04N 21/81* (2011.01)
  *H04L 12/24* (2006.01)
  *G06F 3/14* (2006.01)

(52) U.S. Cl.
  CPC ............ *H04L 41/22* (2013.01); *G06F 3/1423* (2013.01); *G09G 2340/045* (2013.01); *G09G 2340/0407* (2013.01)

(58) Field of Classification Search
  CPC ............... H04N 21/4722; G06Q 30/02; G06Q 30/0241; G06Q 30/0251; G06Q 30/0277; G06Q 30/0601
  USPC ............ 715/723, 756; 725/8, 22, 32, 36, 42; 345/328
  See application file for complete search history.

(56) References Cited

U.S. PATENT DOCUMENTS

| | | | |
|---|---|---|---|
| 5,801,747 A | 9/1998 | Bedard et al. | |
| 5,872,588 A | 2/1999 | Aras et al. | |
| 5,915,243 A | 6/1999 | Smolen | |
| 5,974,451 A * | 10/1999 | Simmons | G06Q 30/02 715/733 |
| 5,982,445 A | 11/1999 | Eyer et al. | |
| 6,002,394 A | 12/1999 | Schein et al. | |
| 6,058,430 A | 5/2000 | Kaplan et al. | |
| 6,073,171 A | 6/2000 | Gaughan et al. | |
| 6,075,971 A | 6/2000 | Williams et al. | |
| 6,097,383 A | 8/2000 | Gaughan et al. | |
| 6,098,106 A | 8/2000 | Philyaw et al. | |
| 6,144,402 A | 11/2000 | Norsworthy et al. | |
| 6,311,214 B1 * | 10/2001 | Rhoads | G06F 17/30876 380/255 |
| 6,647,548 B1 | 11/2003 | Lu et al. | |
| 6,766,524 B1 | 7/2004 | Matheny et al. | |
| 6,928,413 B1 * | 8/2005 | Pulitzer | 705/14.14 |
| 7,003,792 B1 * | 2/2006 | Yuen | 725/46 |
| 7,051,351 B2 | 5/2006 | Goldman et al. | |
| 7,103,904 B1 | 9/2006 | Blackketter et al. | |
| 7,146,631 B1 * | 12/2006 | Tanaka | H04H 40/90 725/112 |
| 7,376,714 B1 * | 5/2008 | Gerken | 709/219 |
| 7,926,076 B2 * | 4/2011 | Kang et al. | 725/60 |
| 2002/0072972 A1 * | 6/2002 | Lamont | 705/14 |
| 2002/0138347 A1 * | 9/2002 | Sakata | 705/14 |
| 2002/0138831 A1 * | 9/2002 | Wachtfogel et al. | 725/32 |
| 2003/0135853 A1 * | 7/2003 | Goldman | G06Q 30/02 725/34 |
| 2006/0277108 A1 * | 12/2006 | Altberg et al. | 705/14 |
| 2008/0109842 A1 * | 5/2008 | Wachtfogel et al. | 725/32 |
| 2008/0275785 A1 * | 11/2008 | Altberg et al. | 705/14 |
| 2009/0094113 A1 * | 4/2009 | Berry et al. | 705/14 |
| 2010/0211459 A1 * | 8/2010 | Seeman et al. | 705/14.46 |
| 2013/0073388 A1 * | 3/2013 | Heath | 705/14.53 |

OTHER PUBLICATIONS

Berney, Kerri, "You Should Know Better, Mr, Spielberg", Feb. 25, 1997, [online] [retrieved on Dec. 7, 2006] Retrived from the Internet <URL: http://members.aol.com/harx1/schlind.html>.

Documents from U.S. Appl. No. 09/767,819: BPA Decision, Aug. 23, 2012; Reply Brief, Examiner's Answer, Appeal Brief, Pre-Appeal Decision, Pre-Appeal Request, Notice of Appeal, Final Rejection, and Amendment/Response.

* cited by examiner

METHOD FOR ADVERTISERS TO SPONSOR BROADCASTS WITHOUT COMMERCIALS

PRIORITY APPLICATION

This is a continuation patent application of patent application, Ser. No. 09/767,819; filed Jan. 22, 2001 by the same applicant. This present patent application draws priority from the referenced patent application. The entire disclosure of the referenced patent application is considered part of the disclosure of the present application and is hereby incorporated by reference herein in its entirety.

BACKGROUND OF THE INVENTION

Television shows on network stations are broadcast to viewers throughout the world at very little cost to the viewer. The production and transmission costs of these broadcasts are typically supported by corporations that interrupt the broadcasts at regular intervals with advertisement, called commercials. As production costs increase, network television shows have less and less content while the viewing time is taken up by commercials. These commercials break up the shows, making the viewing experience less enjoyable and informative. These interruptions have not allowed television viewing to reach its potential and have created much competition from pay-per-view stations, video and DVD rental stores, and movie theaters. If it were not for these commercial interruptions, television viewing would be much greater. If television viewing could be increased while still allowing, corporations to sponsor content, network broadcasters would be much happier and would be able to compete better against other forms of entertainment and education. If corporations could still attract customers by sponsoring shows, they would have no objection to eliminating commercials, especially if it resulted in more television viewers and more customers.

Other means of broadcasting content, are now becoming available on the Internet. Methods are being studied and tested for sponsoring these broadcasts. A method that allows companies to sponsor broadcasts while avoiding commercial interruptions is ideal for the broadcaster and for the viewer. As long as a sponsoring corporation is still able to turn viewers into customers, the corporation will be amenable to the new method, especially if it results in more customers than a standard broadcast that is interrupted by commercials.

SUMMARY OF THE INVENTION

The present invention allows content to be broadcast without commercials interruption, yet lets the company or companies that sponsor the broadcast to offer advertisements and discounts and various special offers to the viewers at a later time of their own choosing. In this application, the terms "broadcast" encompasses all forms of transmitting media content over a WAN to an end user, including radio wave broadcasts such as network television and network radio broadcasts, cable broadcasts such as cable television, and streaming media broadcasts such as video and audio over an Internet connection that may be via telephone lines, television cables, radio waves, etc.

The invention provides a method and apparatus for recording the amount of time spent watching a particular broadcast. The invention also provides a method and apparatus for recording the sponsoring companies or organizations for each broadcast. The invention provides a method and apparatus for the viewer to access a central database at any time, which provides advertisements, coupons, discounts, contests, and other enticements to purchase products, based on the amount of time the viewer spent watching broadcasts that were sponsored by the advertiser.

In one embodiment, the user watches an Internet connected television. At various regular intervals, such as the vertical blanking interval of the television signal, HTTP protocol communications from a Web server are sent to the television, which places a cookie or updates an existing cookie on the television hard drive. This cookie contains information including the time of day, the television channel, the name of the television show, and each sponsor of the show. At a later time, of the viewer's choosing, the viewer can use the Internet connected television to connect to a website. This website can belong to the television network or a particular sponsor or a central clearing house for coupons. When connecting to the website, using the standard HTTP protocol, the website examines the cookie and retrieves the information in it. Each sponsor can then offer advertisements, coupons, discounts, and other enticements to purchase goods based on the amount of time the viewer spent watching a sponsored broadcast.

In a second embodiment, the user watches an Internet connected television. At various regular intervals, such as the vertical blanking interval of the television signal, data is sent to a centralized database for the network or the sponsor or a clearinghouse for coupons. The data contain information including the time of day, the television channel, the name of the television show, and each sponsor of the show. The data also contain a user identifier such as a name, user ID, or television serial number. At a later time, of the viewer's choosing, the viewer can use the Internet connected television to connect to a website that has access to the central database. This website can belong to the television network or a particular sponsor or a central clearing house for coupons. When connecting to the website, using the standard HTTP protocol, the user identifier is sent to the website which then examines the central database and retrieves the information in it for this particular user. Each sponsor can then offer advertisements, coupons, discounts, and other enticements to purchase goods based on the amount of time the viewer spent watching a sponsored broadcast.

In a third embodiment, the user watches a streaming media broadcast from a Web server using a computer with an Internet connection. At various regular intervals during the broadcast, HTTP protocol communications from a Web server are sent to the computer, which places a cookie or updates and existing cookie on the computer hard drive. This cookie contains information including the time of day, the website that is the source of the broadcast, the name of the broadcast content, and each sponsor of the broadcast. At a later time of the viewer's choosing, the viewer can use the computer to connect to a website. This website can belong to the television network or a particular sponsor or a central clearing house for coupons. When connecting to the website, using the standard HTTP protocol, the website examines the cookie and retrieves the information in it. Each sponsor can than offer advertisements, coupons, discounts, and other enticements to purchase goods based on the amount of time the viewer spent watching a sponsored broadcast.

In a fourth embodiment, the user watches a streaming media broadcast from a Web server using a computer with an Internet connection. At various regular intervals during the broadcast, data is sent to a centralized database for the network or the sponsor or a clearinghouse for coupons. The data contain information including the time of day, the website that is the source of the broadcast, the name of the broadcast content, and each sponsor of the show. The data also contain a user identifier such as a name, user ID, or computer serial number. At a later time, of the viewer's choosing, the viewer can use the computer to connect to a website that has access to the central database. This website can belong to the television network or a particular sponsor or a central clearing house for coupons. When connecting to the website, using the standard HTTP protocol, the user identifier is sent to the website which then examines the central database and retrieves the information in it for this particular user. Each sponsor can then offer advertisements, coupons, discounts, and other enticements to purchase goods based on the amount of time the viewer spent watching a sponsored broadcast.

BRIEF DESCRIPTION OF THE DRAWINGS

FIG. 4 shows as general format and a specific format for encoding embedded information in a stream of data.

DETAILED DESCRIPTION

Figure 1:
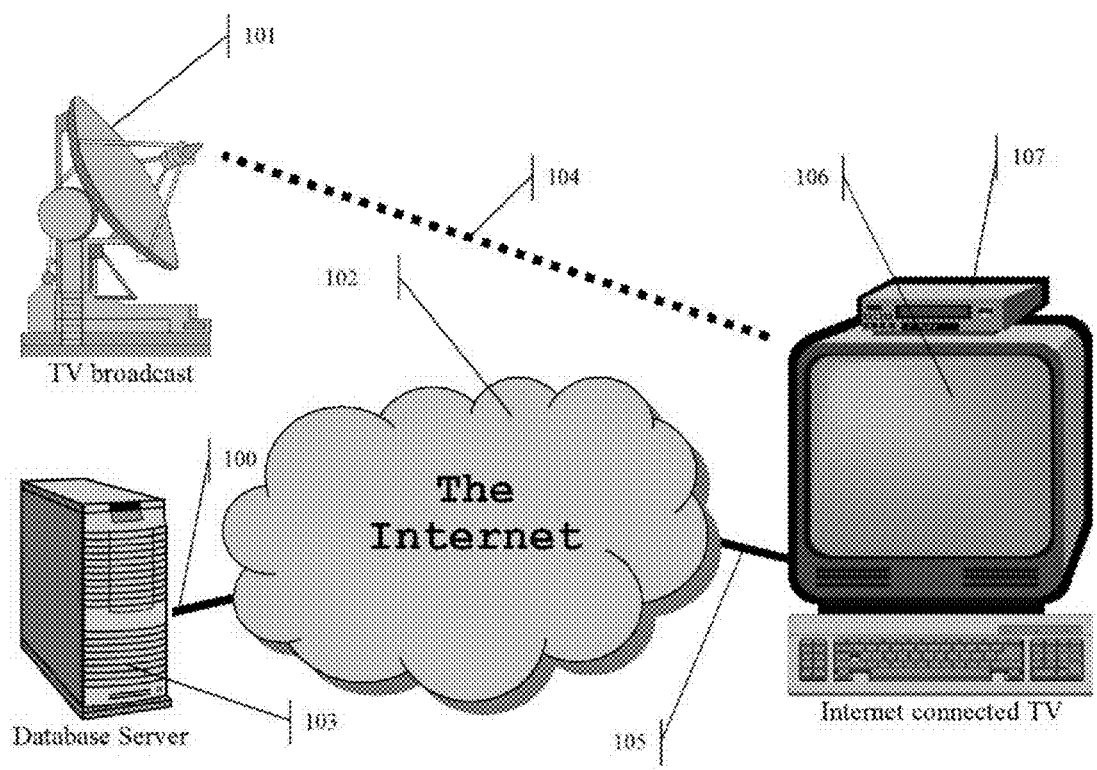
FIG. 1 shows an Intent television 106, a network TV broadcast transmitter 101, a database server 103, and the Internet 102, in accordance with the present invention.
Figure 2:
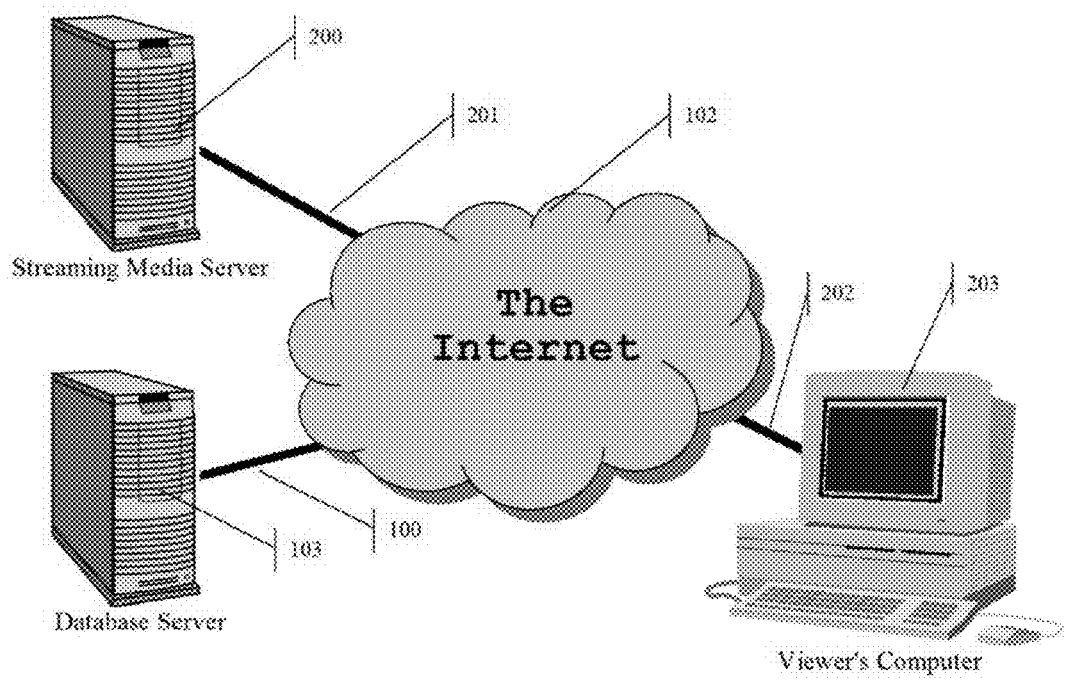
FIG. 2 shows a computer 203, a streaming media server 200, a database server 103, and the Internet 102, in accordance with the present invention.

The present invention is illustrated in FIG. 1 and FIG. 2. FIG. 1 shows one configuration where an Internet-enabled television 106 with a hard disk 107 receives broadcasts 104 from a network television station via transmitter 101. The Internet-enabled TV 106 is also connected for two-way communication to a database server 103 via the Internet 102. In this embodiment, the computer is connected to the Internet via telephone lines 105 using a modem. In this embodiment, the database server is connected to the Internet via a T-1 connection 100.

The television 106 receives one-way transmissions 104 from the network broadcast transmitter 101. Embedded in the transmission are HTTP protocol messages containing information about the show being broadcast, the sponsors of the show, and the current time. Other information can also be embedded and sent to the television 106 for other purposes. The embedded information is stored on the hard disk 107 in the form of a cookie. At a later time, the television 106 connects to the database server 103 which is part of a website on the Internet 102. The database server 103 queries the cookie on the television 106 in order to determine which shows were watched, during which times, and which advertisers sponsored those shows or those segments of shows. Based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the television 106.

In another embodiment, the television 106 receives one-way transmissions 104 from the network broadcast transmitter 101. Embedded in the transmission are HTTP protocol messages containing information about the show being broadcast, the sponsors of the show, and the current time. Other information can also be embedded and sent to the television 106 for other purposes. The embedded information is stored on the hard disk 107. During the broadcast or at a later time, the television 106 connects to the database server 103 which is part of a website on the Internet 102. The television 106 sends the information on the hard disk 107 to the database server 103 via the Internet 102. The database server 103 stores the information in its database. At a later time, based on which advertiser sponsored the show or show segments and the amount of time spent watching the show or show segments, the database server searches the database for coupons, advertisements, discounts, and other enticements to buy products or services from the advertiser, and delivers these enticements via the Internet 102 to the television 106.

FIG. 2 shows another configuration where to computer 203 receives streaming media broadcasts from a streaming media server 200 via the Internet 102. The computer 203 is also connected for two-way communication to a database server 103 via the Internet 102. In this embodiment, the computer is connected to the Internet via telephone lines 202 using as modem. In this embodiment, the database server is connected to the Internet via a T-1 connection 100. In this embodiment, the streaming media server is connected to the Internet via a T-1 connection 201.

The computer 203 receives transmissions from the streaming media server 200 via the Internet 102. Embedded in the transmission are messages containing information about the show being broadcast, the sponsors of the show, and the current time. Other information can also be embedded and sent to the computer 203 for other purposes. The embedded information is stored on the computer's hard disk in the form of a cookie. At a later time, the computer 203 connects to the database server 103 which is part of a website on the Internet 102. The database server 103 queries the cookie on the computer 203 in order to determine which shows were watched, during which times, and which advertisers sponsored those shows or those segments of shows. Based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the computer 203.

In another embodiment, the computer 203 receives transmissions from the streaming media server 200 via the Internet 102. Embedded in the transmission are messages containing information about the show being broadcast, the sponsors of the show, and the current time. Other information can also be embedded and sent to the computer 203 for other purposes. The embedded information is stored on the computer's hard disk. During the broadcast or at a later time, the computer 203 connects to the database server 103 which is part of a website on the Internet 102. The computer 203 transmits the information on its hard disk to the database server 103 via the Internet 102. The database server 103 stores the information in the database. At a Later time, based on which advertiser sponsored the show or show segments and the amount of time spent watching the show or show segments, the database server searches its database for coupons, advertisements, discounts, and other enticements to buy products or services from the advertiser, and delivers these enticements via the Internet 102 to the computer 203.

Figure 3:
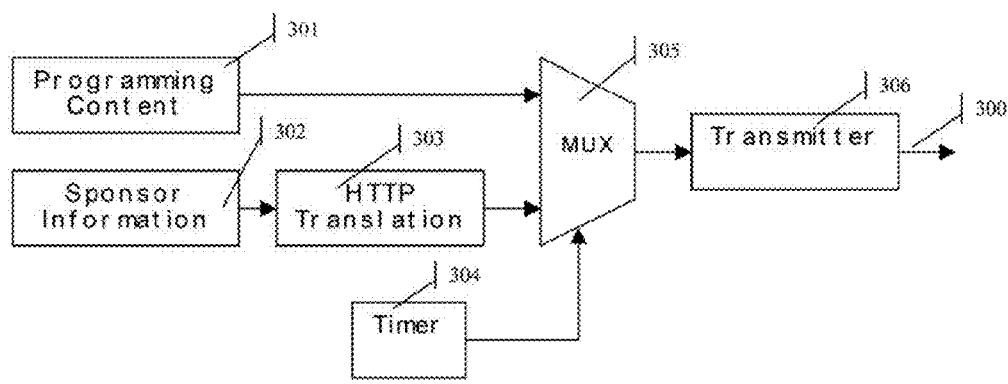
FIG. 3 shows a mechanism for combining broadcast information with broadcast content during a broadcast transmission.

FIG. 3 shows an embodiment in which content with imbedded information is created from normal broadcast content. The method shown can be implemented in hardware or software or combinations of hardware and software. Sponsor information 302 is translated into a format such as HTTP protocol using HTTP translator 303. It is then combined with the programming content 301, such as a television show or streaming video, through multiplexer 305. The multiplexer inserts the sponsor information at regular periods, or frames, throughout the broadcast by using timer 304. A frame may be a single television picture scan, or it may be a single frame of streaming video data or it may be an arbitrary amount of data. The sponsor information can be inserted into the data stream at a time or in such a way that it does not destroy data, such as during the vertical blanking time of a television frame scan. The data put into the transmitter 306, which is then transmitted as analog or digital data 300.

FIG. 4 shows an embodiment of a general format and a specific format or the embedded sponsor information as a stream of data. A packet is inserted before a frame of content data, which includes the head 400, content name 401, the current date 402, the current time 403, the sponsor name 404, and other data 405 as required. The head can be a start-of-slice (SOS) flag or an end-of-slice (EOS) flag, which signal the start or end of a time slice respectively. An example of specific information is shown where the head is start-of-slice 406, content name is "Star Trek" 407, the date is "Jan. 1, 2000" 408, the time is "9:07 PM" 409, the sponsor is "Proctor and Gamble" 410, and a special offer 411 is included for the viewer at this time.

Figure 5:
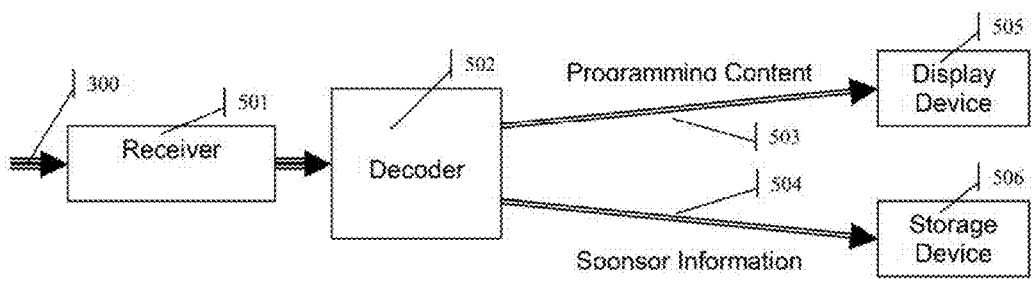
FIG. 5 shows a mechanism for separating broadcast information and broadcast content from a broadcast transmission.

FIG. 5 shows an embodiment in which the sponsor information is separated from the broadcast content rising hardware or software or a combination of hardware and software. The software portion of the implementation may he a stand-alone media player software or a plug-in to a Web browser. The broadcast stream 300, which may be a television picture or a streaming video is received by a receiver 501 that converts the signal to one that is usable by the decoder 502 that splits the information into programming content 503 and sponsor information 504. The programming content 503 is sent to a display device 505 such as a computer monitor or television screen. The sponsor information 504 is recorded on a storage device 506 such as a hard disk.

Figure 6:
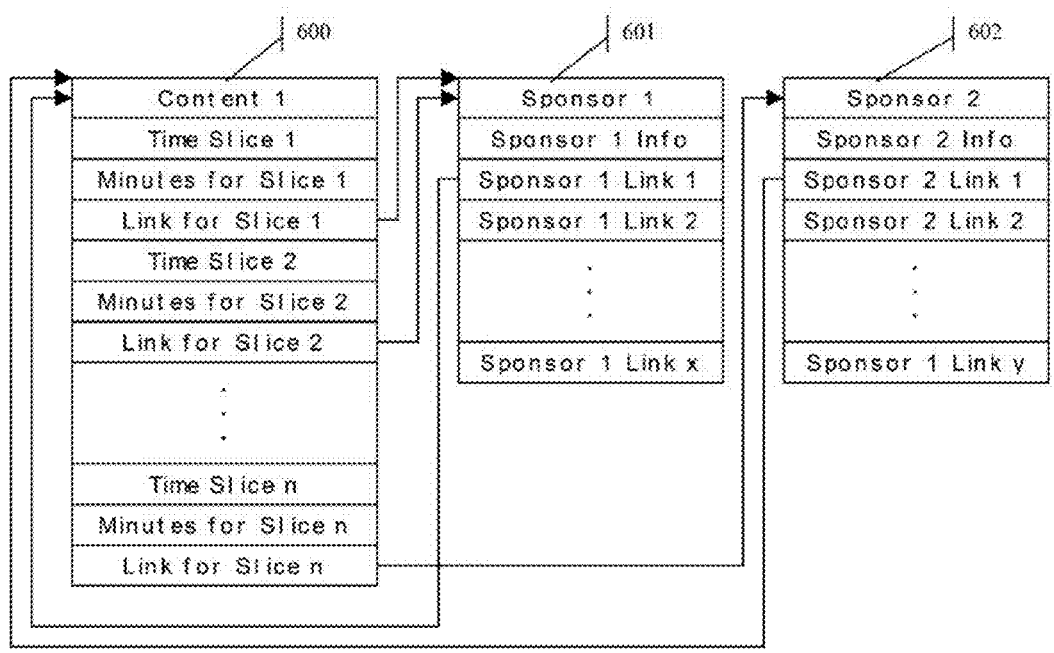
FIG. 6 to shows a format for storing the embedded information on the client storage device 506 in a database.

FIG. 6 shows one embodiment of the format for storing the embedded information on the client storage device 506 in a database. For each television show or video clip there is an entry block 600 containing several records. The first record contains the name of the content. There are sections for each time slice of the content broadcast. These time slices may, for example, be 15-minute intervals so that there are 4 slices in a one-hour broadcast. Sponsors may then sponsor 1 to 4 slices of a one-hour broadcast. Associated with each time slice in the database are 3 records. One record contains the name of the time slice. Another record contains the number of minutes during that time slice that the viewer was actually watching the broadcast. Another record contains a link to a sponsor block in the database for the sponsor of that time slice. There may be multiple records for links to multiple sponsors of a broadcast time slice.

A sponsor block, such as 601 or 602, contains multiple records. One record contains the name of the sponsor. Another record contains information about the sponsor. Other records contain links to content that is sponsored by the sponsor. Having both content blocks and sponsor blocks in the database, with links to each other, allows the database to easily be searched for all content sponsored by a specific sponsor, or all sponsors of particular content.

Figure 7:
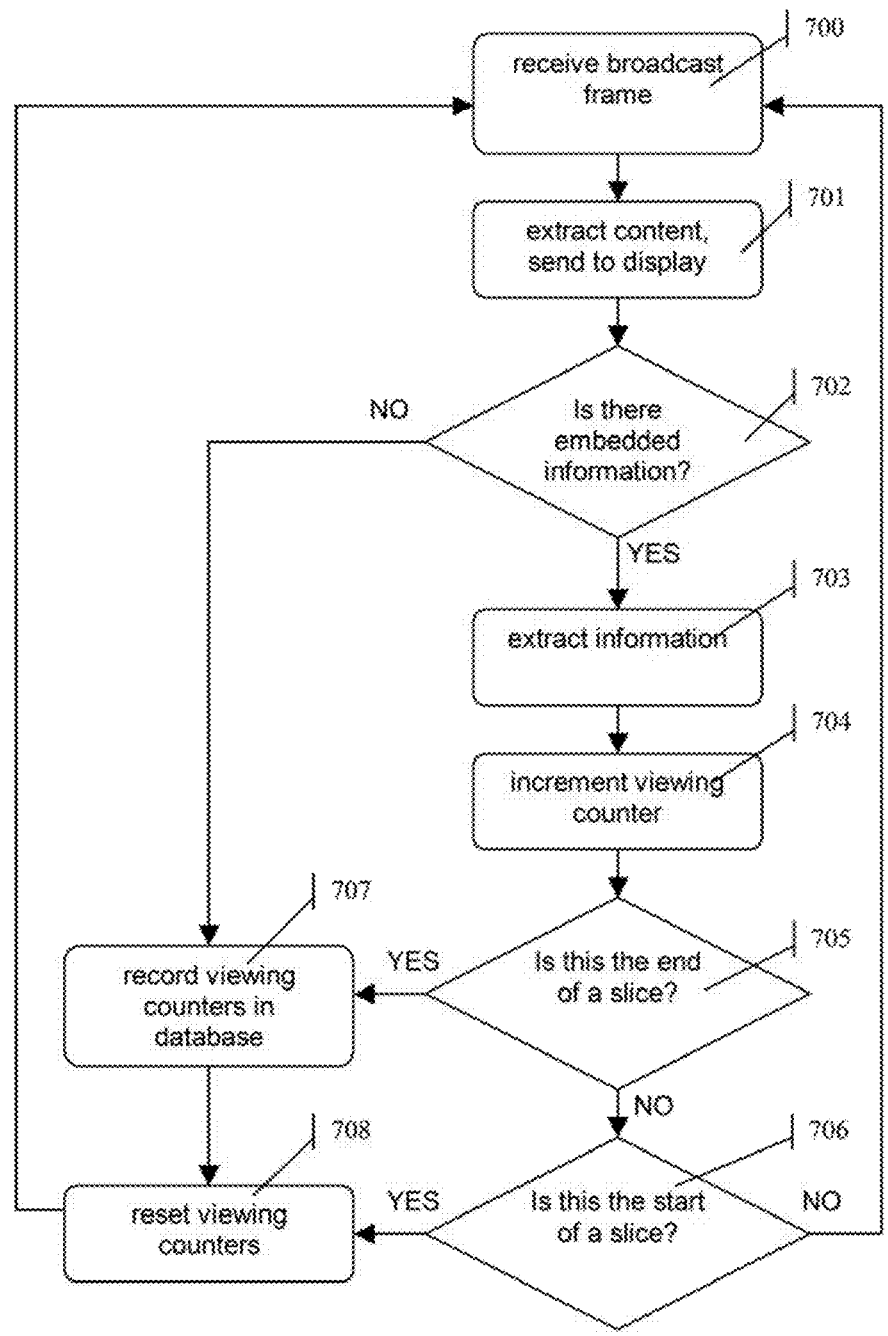
FIG. 7 shows an algorithm within the decoder 502 that strips out embedded information and creates the database records 600, 601, 602

FIG. 7 shows an embodiment of the algorithm within the decoder 502 that strips out embedded information and creates the database records 600, 601, 602. This algorithm may be implemented in software or hardware or a combination of software and hardware. Execution starts at block 700 where a frame of broadcast content is received. The content information is separated out and sent to the display device by executing block 701. Execution of block 702 searches for embedded sponsor information in the broadcast. If there is no embedded sponsor information, execution is transferred to block 707. This may be due to the fact that the viewer has switched between a commercial-free broadcast to sonic other content such as a normal commercial broadcast. If there is embedded sponsor information, block 703 is executed, extracting that information. Block 704 is then executed where viewing counters are incremented. These viewing counters keep track of how much time the viewer has spent viewing the content. In block 705, the embedded information is examined for an end-of-slice marker that signals the end of a time slice. If this marker is found, execution is transferred to block 707. Otherwise, execution is transferred to block 706 where the embedded information is examined for a start-of-slice marker that signals the start of a time slice. If this marker is found, execution is transferred to block 708. Otherwise execution is transferred back to block 700 and the process is repeated.

Block 707 is executed when a time slice has ended or the viewer has switched to another type of broadcast. When this block is executed, the viewing counters are recorded in the database on the client machine. Execution is then transferred to block 708.

Block 708 is executed at the start of as new time slice. This block resets the viewing; counters and transfers execution to block 700, starting the entire process over.

Figure 8:
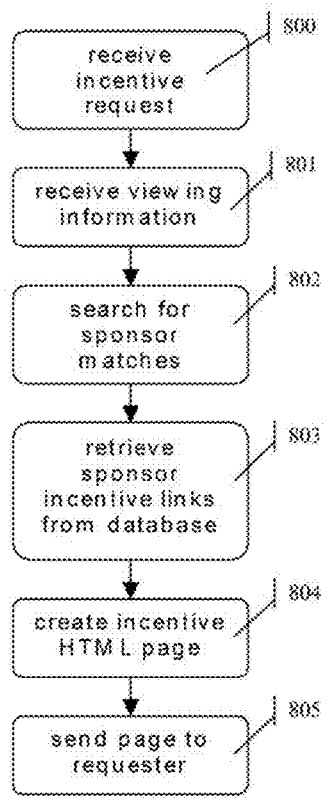
FIG. 8 shows an algorithm within the database server 103 that gives incentives back to the viewer.

FIG. 8 shows an embodiment of the algorithm within the database server 103 that gives incentives back to the viewer. Execution starts in block 800 when a request for an incentive is received from the viewer. Execution continues to block 801 where, through handshaking protocol, the information in the client database stored in storage device 506 on the viewer's computer 203 or Internet connected TV 106 is used to query the database of database server 103. Execution continues to block 802 where the database server searches its database for matches with the sponsors reported by the viewer. Execution continues to block 803 where links to sponsor Web pages are retrieved from the database server based on the information from the viewer. Execution continues to block 804 where an entire HTML page is created which contains links to all incentives to which the viewer is entitled, based on the amount of time he spent viewing specific content. Execution continues to block 805 where this Web page is then sent back to the viewer. At this time, the viewer can click on links to obtain coupons, discounts, special offers, etc.

Figure 9:
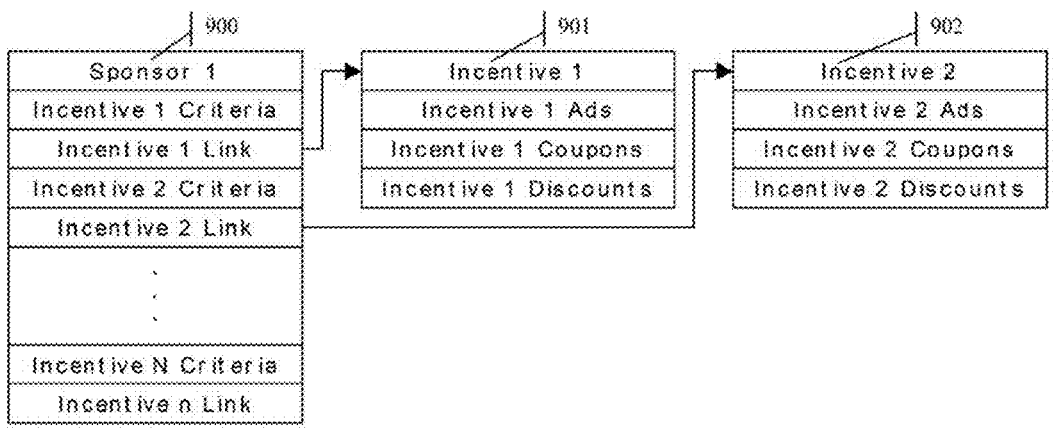
FIG. 9 shows data that is contained in blocks in the database on the database server 103.

FIG. 9 shows an embodiment of the data that is contained in blocks in the database on the database server 103. For each sponsor, there is a block of records 900 that contains multiple records. One record contains the sponsor name. For each incentive, there are two records. One of these records contains the criteria for the viewer to receive the incentive such as a specific amount of time watching a particular broadcast. The other record contains a link to the particular incentive. Each incentive has a block of records such as 901 and 902. The block includes a record of the incentive name, and a number of other records that contain information about advertisements, coupons, discounts, etc. that should be offered to the viewer who has met the incentive criteria.

I claim:

1. A computer-implemented method comprising:
   receiving a transmission of a broadcast, the transmission including embedded information and content, the embedded information including data associated with the content, the data comprising at least one of a TV channel, content name, timestamp, time slice, and sponsor identification;
   determining if there is any embedded information in the broadcast;
   extracting the content from the broadcast by use of a decoder to split the extracted content from the embedded information, the embedded information being one or more data packets inserted in the broadcast with a frame of content;
   sending the extracted content to a display;
   examining the embedded information for an end-of-slice marker that signals the end of a time slice;
   maintaining viewing counters to keep track of how much time a viewer spent viewing the content corresponding to the time slice;
   recording the viewing counters as viewing information when the end of a time slice is detected, the time slice corresponding to the sponsor identification;
   storing the embedded information on a storage device of a computer;
   transmitting a user identifier and the viewing information to a remote server; and
   receiving an enticement based on the embedded information, the viewing information, user information retrieved based on the user identifier, and a sponsor of the time slice corresponding to the sponsor identification.

2. The computer-implemented method of claim 1, wherein the user identifier is a serial number.

3. The computer-implemented method of claim 1, wherein the computer is a television.

4. The computer-implemented method of claim 1, wherein the enticement is received from the remote server.

5. The computer-implemented method of claim 1, further comprising performing the transmitting at a later time than the sending.

6. The computer-implemented method of claim 1, further comprising performing the receiving the enticement at a later time than the sending.

7. The computer-implemented method of claim 1, wherein the enticement includes at least one of a web site link, a coupon, an advertisement, a discount, or another incentive to buy a product or service from an advertiser, associated with the transmission.

8. The computer-implemented method of claim 1, wherein the content is sent to the display without commercial interruption.

9. The computer-implemented method of claim 1 wherein the viewing information includes an amount of time the content is sent to the display.

10. A computer comprising:
    a receiver configured to receive a transmission of a broadcast, the transmission including embedded information and content, the embedded information including data associated with the content, the data comprising at least one of a TV channel, content name, timestamp, time slice, and sponsor identification, the receiver being further configured to determine if there is any embedded information in the broadcast, to extract the content from the broadcast by use of a decoder to split the extracted content from the embedded information, the embedded information being one or more data packets inserted in the broadcast with a frame of content, and to send the extracted content to a display, the receiver being further configured to examine the embedded information for an end-of-slice marker that signals the end of a time slice, to maintain viewing counters to keep track of how much time a viewer spent viewing the content corresponding to the time slice, and to record the viewing counters as viewing information when the end of a time slice is detected, the time slice corresponding to the sponsor identification;
    a storage device for storing the embedded information;
    a transmitter configured to transmit a user identifier and the viewing information to a remote server; and
    the receiver further configured to receive an enticement based the embedded information, the viewing information, user information retrieved based on the user identifier, and a sponsor of the time slice corresponding to the sponsor identification.

11. The computer of claim 10, wherein the user identifier is a serial number of the computer.

12. The computer of claim 10, wherein the computer is a television.

13. The computer of claim 10, wherein the enticement includes at least one of a website link, a coupon, an advertisement, a discount, or another incentive to buy a product or service from an advertiser, associated with the transmission.

14. The computer of claim 10 wherein the receiver is further configured to send the extracted content to a display without commercial interruption.

15. The computer of claim 10 wherein the viewing information includes information indicative of an amount of time the content is sent to the display.

16. The computer of claim 10, wherein the viewing information further comprising the time that the content was viewed.

17. The computer of claim 10 wherein the storage device is configured to store a cookie on the computer.

18. A computer-implemented method comprising:
    combining content with embedded information in a broadcast by use of a multiplexer, the multiplexer inserting the embedded information into the broadcast at pre-defined intervals throughout the broadcast by use of a timer, the embedded information including at least one end-of-slice marker that signals the end of a time slice, the time slice corresponding to a sponsor identification;
    transmitting the broadcast including the embedded information and the content, the embedded information including data associated with the content, the data comprising at least one of a TV channel, content name, timestamp, the time slice, and the sponsor identification;

receiving, from a device, a user identifier and viewing information, the viewing information specifying how much time a viewer spent viewing the content corresponding to the time slice;

retrieving user information associated with the user identifier;

searching a database for an enticement based on the user information, the viewing information, and the sponsor identification; and transmitting the enticement based on at least one of: the embedded information, the viewing information, the user information, and a sponsor of the broadcast.

19. The computer-implemented method of claim 18, wherein the user identifier is a serial number.

20. The computer-implemented method of claim 18, wherein the viewing information includes the time that the content was viewed on the device.

21. The computer-implemented method of claim 18, further comprising storing user information in a database.

22. The computer-implemented method of claim 18, further comprising causing the content of the transmission to be presented on the device.

23. The computer-implemented method of claim 18 wherein the content is transmitted without commercial interruption.

24. The computer-implemented method of claim 18, wherein transmitting the enticement occurs at a later time relative to transmitting the broadcast.

25. The computer-implemented method of claim 18, wherein the enticement includes at least one of a website link, a coupon, an advertisement, a discount, or another incentive to buy a product or service from an advertiser, associated with the transmission.

26. The computer-implemented method of claim 20 wherein searching the database for the enticement is further based on the amount of time the content was viewed on the device.

27. A system comprising:

a transmitter configured to transmit a broadcast including embedded information and content, the embedded information including data associated with the content, the data comprising at least one of a TV channel, content name, timestamp, time slice, and sponsor identification, the transmitter being further configured to combine the content with the embedded information in the broadcast by use of a multiplexer, the multiplexer inserting the embedded information into the broadcast at pre-defined intervals throughout the broadcast by use of a timer, the embedded information including at least one end-of-slice marker that signals the end of a time slice, the time slice corresponding to a sponsor identification;

a receiver configured to receive, from a device, a user identifier and viewing information, the viewing information specifying how much time a viewer spent viewing the content corresponding to the time slice;

a controller configured to retrieve user information associated with the user identifier, and to search a database for an enticement based on the user information, the viewing information, and the sponsor identification, and to transmit the enticement based on at least one of: the embedded information, the viewing information, the user information, and a sponsor of the broadcast.

28. The system of claim 27, wherein the device is a computer and the user identifier is a serial number of the computer.

29. The system of claim 27, wherein the device is a television.

30. The system of claim 27, wherein the content is transmitted without commercial interruption.

31. The system of claim 27, wherein the viewing information includes the time that the content was viewed on the device.

32. The system of claim 27, wherein the enticement includes at least one of a website link, a coupon, an advertisement, a discount, or another incentive to buy a product or service from an advertiser, associated with the broadcast.

33. The system of claim 27, further configured to store user information in a database.

34. The system of claim 27, wherein the controller is further configured to transmit the enticements at a later time than the transmission of the content.

* * * * *